Figure 1:
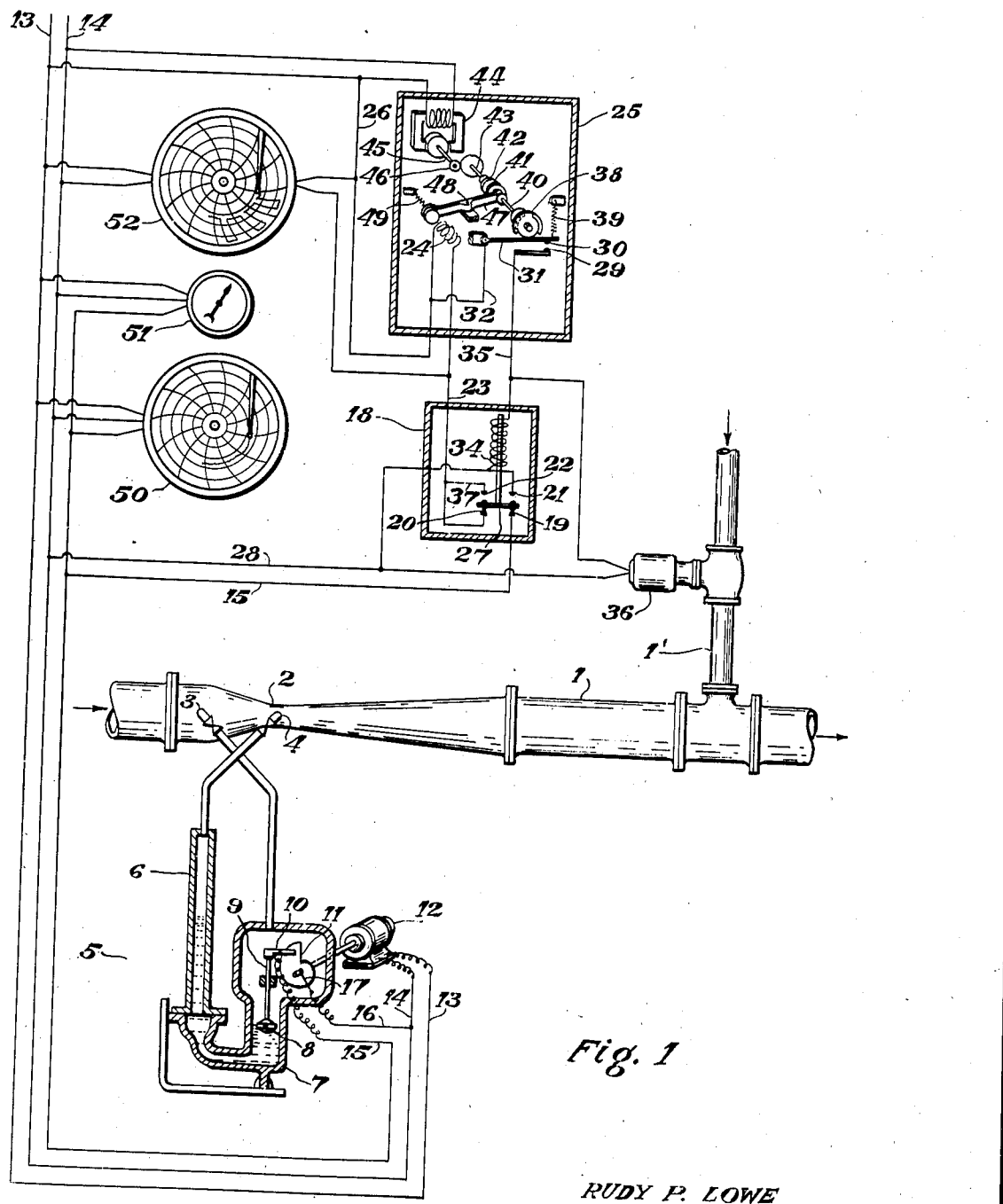

April 22, 1941.   R. P. LOWE   2,239,157
TELEMETRIC CONTROLLER FOR DEPENDENT QUANTITIES
Filed Dec. 4, 1937

RUDY P. LOWE
INVENTOR

BY
Maxwell Barnes
ATTORNEY

Patented Apr. 22, 1941

2,239,157

UNITED STATES PATENT OFFICE 2,239,157

TELEMETRIC CONTROLLER FOR DEPENDENT QUANTITIES

Rudy P. Lowe, Cranston, R. I., assignor to Builders Iron Foundry, Providence, R. I., a corporation of Rhode Island Application December 4, 1937, Serial No. 178,180

7 Claims. (Cl. 137—165)

This invention relates to methods of and apparatus for controlling a dependent quantity by a master quantity. An object is to provide a novel control system wherein the dependent quantity may be effectively controlled in response to predetermined integrations of the master quantity. The invention further provides, more specifically, for the control over feeding of quantities of a substance in response to accumulated rates of delivery or flow of another substance. A further specific object is the provision of a new and efficient apparatus for the proportioning of one substance with respect to another. In addition the invention provides for the control of feeding of a substance for periods of equal duration in response to predetermined summations or integrations of rates of delivery of a substance. Further features and advantages will be hereinafter described and claimed.

The accompanying drawing shows a diagrammatic elevation, with parts in section, of an embodiment of my invention. The latter is illustrated as applied to the feeding of a liquid under control of the rate of flow of another liquid, but it will be understood that such is merely illustrative and that the use of the invention is not restricted to liquids or to any particular substance or quantity.

Referring to the drawing, the flow of liquid through conduit 1 is caused to produce a differential pressure in any suitable way, as through the provision of a Venturi section 2 in said conduit. A high pressure tap 3 is connected to leg 7 of a conventional U-tube containing a manometric liquid such as mercury, while the low pressure tap 4 is connected to leg 6 of said U-tube. A float 8, to which is attached a rod 9 and contactor 10, rests upon the surface of the manometric liquid and is thus positioned proportionally to the differential pressure between points 3 and 4, or, in other words, in proportion to the square of the rate of flow of the liquid in the conduit 1. Contactor 10 engages a cam 11 which is continuously driven at a constant speed by synchronous motor 12. Cam 11 is so shaped that the period of engagement of contactor 9 therewith in each cycle is proportional to the square root of the differential pressure between points 3 and 4 and is thus proportional to the rate of flow of liquid in conduit 1.

Motor 12 is connected to a source of alternating electric current through supply wires 13 and 14. A wire 15 is connected to contactor 10, while a wire 16 from wire 15 is connected to the shaft of cam 11 by a suitable brush 17. Wire 15 leads to contact 19 of a double-pole double-throw relay 18, the co-acting contact 20 of which relay is connected to wire 23, which leads to the coil 24 of a solenoid in the program clock 25. Wire 26 from coil 24 leads to main 13, thus completing a circuit from main 14 through wire 16, brush 17, cam 11, contact arm 10, wire 15, contact 19, armature 27, contact 20, wire 23, coil 24 and wire 26 to main 13. Said coil 24 is thus energized in each cycle for a period proportional to the rate of flow of the liquid in conduit 1.

Also connected to main 14 is a wire 28 leading to a contact 21 of relay 18 and to coil 34 of said relay. The other end of coil 34 is connected by wire 35 to contact 29 of program clock 25. A solenoid valve of conventional construction, for controlling the flow of liquid in a conduit 1', is connected between wires 28 and 35. Relay 18 also includes a contact 22 which is connected to wire 23 by wire 37.

Coacting with contact 29 of the program clock 25 is contact 30 on arm 31, which is connected to wire 26 by wire 32, and is continuously biased against cam 38 by a spring 39. Said cam 38 is secured to a shaft 40 on which is splined a slidable clutch member 41 adapted to be shifted into and out of engagement with a companion clutch member 42 secured to a shaft 43. The latter is continuously rotated at constant speed by synchronous motor 44 through shaft 45 and reduction gearing 46. Sliding member 41 is actuated by a lever 47, pivoted at 48 and moved by solenoid 24 against a biasing spring 49.

The operation of the embodiment above described is as follows:

In each cycle or revolution of cam 11, upon the engagement of said cam with contactor 10, current flows from wire 14 through wire 15, contact 19, armature 27, contact 20, wire 23, solenoid 24, and wire 26 to wire 13. The duration of said current flow in each cycle is proportional to the square root of the differential pressure between taps 3 and 4 and hence to the rate of flow of the liquid in conduit 1. Thus, coil 24 is energized, and cam 38 clutched to shaft 43, for a period in each cycle proportional to said rate of flow, and cam 38 is rotated through an extent commensurate with said rate.

When the sum of the time signals from cam 11 and arm 10 reaches a predetermined amount, cam 38 closes contacts 30 and 29, thereby completing a circuit from wire 14 through wire 28, coil 34 of relay 18, wire 35, contacts 29 and 30, wire 32, and wire 26 to wire 13. At the same time a circuit is completed through solenoid valve 36, which is thereby operated to permit liquid in conduit 1' to flow into conduit 1. The above-mentioned energization of coil 34 withdraws armature 27 from contacts 19 and 20 and engages said armature with contacts 21 and 22, whereupon a circuit is completed from wire 28 through contact 21, armature 27, contact 22, wires 37 and 23, coil 24, and wire 26, to maintain the clutch elements 41 and 42 in engagement, whereby cam 38 is continuously driven by motor 44 until said cam allows contact 30 to become disengaged from contact 29. Upon opening of said contacts, coil 34 and solenoid 36 are de-energized, the flow of liquid from conduit 1' into conduit 1 is cut off, and armature 27 drops to its initial position, engaging contacts 19 and 20, whereupon the operation above outlined is repeated.

It will be seen from the foregoing that I have provided for the summation or integration of the rates of flow through conduit 1 and for the operation of valve 36 to permit liquid to flow from conduit 1' into conduit 1 in response to the attainment of a predetermined summation of said rates by operation of the cam 38. Upon the attainment of said summation, the solenoid valve 36 is operated and remains operated for a predetermined constant period of time, permitting a definite quantity of liquid to flow into conduit 1 from conduit 1'. While for purposes of illustration, the conduit 1' is shown connected to conduit 1 it will be understood that the conduit 1' may be entirely disconnected from conduit 1. It will be furthermore apparent that the use of the invention is not restricted to liquids and that it is applicable also to the feeding of other substances.

At 50 there is shown, connected to wire 15 and to mains 13 and 14, a recorder of well-known type for exhibiting the flow through the conduit 1, while at 51 there is illustrated a well-known integrator for indicating the sum of the flow rates in conduit 1, or in other words, the total quantity of flow in said conduit. Connected to wires 23 and 26, and also to mains 13 and 14, is another conventional recorder for exhibiting the frequency and duration of operation of valve 36.

The cam 38 may, as indicated in the drawing, be composed of adjustable parts so that the period of engagement of the contacts 29 and 30 may be lengthened or decreased as desired, as will be apparent. Thereby the ratio between the period of operation of the valve 36 and the time of integrated flows may be varied.

It will also be evident that the gear ratio between motor 44 and shaft 43 may be selected to provide any desired speed of rotation of the latter.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetric controller, means for cyclically transmitting signals of a function of time corresponding with values of a variable quantity, means responsive to said signals for integrating said values, means for controlling a dependent quantity, and means controlled by said integrating means for initiating operation of said controlling means in response to a predetermined accumulation of said values and for continuing operation of said controlling means for a predetermined time uninfluenced by said signals.

2. In a telemetric controller, means responsive to the rate of delivery of a substance for transmitting cyclical signals of a function of time corresponding to said rate, means responsive to said signals for integrating the transmitted values of said rate, means for controlling the delivery of a second substance, means controlled by said integrating means for initiating operation of said controlling means in response to the accumulation of a predetermined sum of said values, and means for continuing the operation of said controlling means independently of said signals to cause the delivery of said second substance for a predetermined time.

3. In a telemetric controller, means for cyclically transmitting signals of a function of time corresponding with values of a variable quantity, means responsive to said signals for integrating said values, means for controlling a dependent quantity, electric circuit controlling means brought into action by said integrating means upon a predetermined accumulation of said values for initiating operation of the first mentioned controlling means and for maintaining the latter in action for a predetermined time irrespective of said signals.

4. In a telemetric controller, means for cyclically transmitting signals corresponding with the rate of flow of a liquid, means responsive to said signals for integrating said rate, means for controlling the flow of another liquid, means responsive to said integrating means upon the accumulation of a predetermined summation of said rate for initiating operation of said controlling means, and means for continuing the operation of said controlling means for a predetermined time irrespective of said signals.

5. In a telemetric controller, means for cyclically transmitting signals of a function of time corresponding with values of a variable quantity, means responsive to said signals for integrating said values, means for controlling a dependent quantity, electric contacts controlling a circuit through the first mentioned controlling means, and means controlled by said integrating means for operating said contacts to bring said first-mentioned controlling means into action in response to a predetermined accumulation of the values of said variable quantity and for continuing operation of said first-mentioned controlling means for a predetermined time uninfluenced by said signals.

6. In a telemetric controller as defined by claim 5, means for insuring continuation of the operation of said contacts to maintain said first mentioned controlling means in operation for a predetermined period uninfluenced by said signals.

7. In a telemetric controller as defined by claim 5, other electric contacts brought into action in response to a predetermined accumulation of the values of a variable for insuring continuation of the operation of said controlling means for a predetermined period uninfluenced by said signals.

RUDY P. LOWE.